United States Patent Office 3,560,192
Patented Feb. 2, 1971

3,560,192
MICRONUTRIENT ENRICHED GRANULAR
FERTILIZERS
George Di Cicco, Lawrenceville County, N.J., assignor to American Cyanamid Company, Stamford, Conn.
No Drawing. Filed May 3, 1968, Ser. No. 726,580
Int. Cl. C05b 7/00
U.S. Cl. 71—51    8 Claims

ABSTRACT OF THE DISCLOSURE

Free-flowing and uniform micronutrient enriched fertilizer compositions are provided. The compositions include a granular fertilizer, up to about 20% by weight of a finely divided micronutrient, and an aqueous zinc chloride binder solution. The zinc chloride binder is present in an amount sufficient to bind the micronutrient to the surface of the fertilizer granules without destroying the fertilizer's free-flowing properties. The compositions are prepared by first moistening the surfaces of the fertilizer granules with the binder and then mixing the micronutrient with the moistened granules until adhesion is substantially complete.

---

This invention relates to micronutrient enriched fertilizer compositions. More particularly, it relates to granular fertilizer compositions containing up to about 20% of a finely divided micronutrient, which is uniformly distributed throughout the fertilizer composition and adhered to the surfaces of the fertilizer granules.

Fertilizers, in general, are used to supply soil with massive doses of plant nutrients such as nitrogen, potassium, phosphorus, calcium, magnesium, and sulfur. In addition, it is often desirable to include in fertilizers minor amounts of other nutrients, depending upon the condition or particular deficiencies of the soil to be treated. Exemplary of such other nutrients, commonly referred to as micronutrients, are zinc, manganese, iron, boron, copper, and the like.

Soil micronutrient deficiencies vary considerably between geographic locations, and generally it is desirable to mix the required micronutrients with fertilizers as demand for them arises, thereby avoiding the problem of maintaining large inventories of a variety of micronutrient enriched fertilizers to satisfy varying requirements. Unfortunately, entirely satisfactory modes of addition of micronutrients to previously prepared fertilizer compositions have not been heretofore achieved. The micronutrients added to such compositions usually tend to separate out, resulting in a nonuniform distribution of the micronutrients and an unsatisfactory fertilizer composition.

For this reason, various liquids, such as water or oil, have been used to wet the surfaces of the fertilizer granules and bind the micronutrients to the wetted surfaces in attempts to improve the uniformity of the micronutrient enriched fertilizer composition. The use of water as a binder, however, places an upper limit on the amount of micronutrient that can be included in the composition because the amount of water required to bind large amounts of micronutrients to the fertilizer granules causes fertilizers to cake on storage, making them difficult and inconvenient to use.

Further, micronutrient elements are often used in the form of their oxides or salts, making it necessary to add even greater amounts of the micronutrient compound and hence greater amounts of binder to secure the desired level of micronutrient element in the fertilizer composition, thus further aggravating the caking tendencies of the resulting enriched compositions. Without sufficient binder, separation and subsequent segregation of the micronutrient compound will occur, resulting in nonuniform compositions.

While oil binders avoid the problems of caking in fertilizer compositions, they tend to make the overall compositions messy and inconvenient to use, and also present serious explosion hazards, particularly when used in combination with certain fertilizers, such as ammonium nitrate.

A particularly important and widely used micronutrient is zinc which is generally added to fertilizers in the form of zinc oxide or zinc sulfate. In the past, however, it has been difficult to combine large amounts, generally above about 15% by weight, of these zinc compounds with granular fertilizer and still provide uniform, free-flowing fertilizer compositions, due to the water solubility and other physical characteristics of these compounds. Further, these zinc compounds, when used in such large amounts, have a tendency to react with fertilizers containing ammonium, resulting in an undesirable loss of free ammonia.

It is therefore a primary object of this invention to provide a new and improved micronutrient enriched fertilizer composition in which high levels of one or more finely divided micronutrients are uniformly and stably distributed throughout a fertilizer composition which is resistant to caking and is convenient and easy to handle in use.

Yet another object of one embodiment of this invention is to provide a new and improved granular fertilizer composition containing a uniform and stable distribution of large amounts, generally up to 20% by weight, of a finely divided zinc micronutrient compound such as zinc oxide or zinc sulfate.

Still another object of this invention is to provide an ammonium fertilizer composition containing a zinc micronutrient compound in which the generation and loss of free ammonia is substantially prevented.

Yet a further object of this invention is to provide a new and improved method for combining finely divided micronutrients with granular fertilizers to provide uniform and stable micronutrient enriched fertilizer compositions without destroying the free-flowing characteristics of the fertilizer granules.

Yet a further object of this invention is to provide a simple and inexpensive method for the preparation of uniform and stable micronutrient enriched fertilizer compositions.

Additional objects and advantages will be set forth in part in the description which follows and in part will be obvious from the description or may be learned by practice of the invention, the objects and advantages being realized and attained by means of the compositions, processes, and improvements particularly pointed out in the appended claims.

To achieve the foregoing objects and in accordance with its purpose, this invention, as embodied and broadly described, provides a micronutrient enriched fertilizer composition comprising a granular fertilizer, up to about 20% by weight of at least one finely divided micronutrient, and a sufficient amount of an aqueous zinc chloride binder solution containing from about 40 to 70% zinc chloride to bind the micronutrient to the fertilizer granules.

The present invention further provides a process for preparing a free-flowing and uniform micronutrient enriched fertilizer composition which comprises mixing together a granular fertilizer and an aqueous zinc chloride solution containing 40 to 70% zinc chloride to moisten the surfaces of the fertilizer granules, and then mixing the moistened granules with up to 20%, based on the weight of the final composition, of one or more finely divided micronutrients. The mixing of the micronutrient and moistened granules is continued until the micronutrient is adhered to the surfaces of the fertilizer granules.

Preferred micronutrients for use in the compositions and methods of this invention are zinc micronutrient compounds, such as zinc oxide or zinc sulfate.

It is to be understood that both the foregoing general description and the following detailed description are exemplary and explanatory but are not restrictive of the invention.

The granular fertilizers useful in this invention include such well-known fertilizer compositions as diammonium phosphate, ammonium nitrate, ammonium sulfate, triple superphosphate, potassium chloride, potash, and the like, and mixtures of two or more of such compounds. These granular fertilizers are free-flowing and generally have a particle size of from −5 to +20 mesh screen size.

Suitable micronutrients that can be combined with these fertilizers to provide the enriched fertilizer compositions in accordance with this invention include zinc, manganese, iron, boron, copper, and the like. These micronutrients are generally combined with the fertilizer in the form of a finely divided salt of the micronutrient element having a particle size of approximately −100 to −400 mesh screen size. Zinc micronutrients which are usually added in the form of zinc oxide and zinc sulfate are particularly important micronutrient compounds and are incorporated in enriched granular fertilizer compositions in accordance with a preferred embodiment of this invention.

Uniform and stable distributions of micronutrients in granular fertilizer compositions are provided by binding finely divided micronutrient particles to the fertilizer granules with an aqueous zinc chloride solution.

The solution generally contains from about 40 to 70% zinc chloride and should be used in an amount sufficient to bind the micronutrient to the granules without adding excessive moisture to the composition. Generally, sufficient adhesion of the micronutrient is obtained when the quantity of the binder is about one-half of the weight of the micronutrient.

In accordance with a preferred embodiment of this invention, the amount of zinc chloride solution present in the final enriched fertilizer composition is about 0.1 to 12% by weight of the total composition. At least about 0.1% by weight of the binder is necessary to achieve the desired binding effect. Use of amounts of aqueous binder solution greater than about 12% by weight of the final composition tends to add too much moisture to the compositions, making them susceptible to caking during storage.

Preferably, the aqueous zinc chloride solution contains from about 50 to 66% zinc chloride. While zinc chloride solutions containing more than about 66% zinc chloride are effective adhesives for the micronutrient, they are not are desirable as less concentrated solutions, since they tend to be too viscous for spray application to the surface of fertilizer granules.

It has been found that moistening the surface of the fertilizer granules with the zinc chloride solutions of the type described above provides a uniform and stable distribution of up to about 20% by weight of micronutrient containing compounds in enriched fertilizer compositions. The micronutrients can be combined with the fertilizers in this manner without rendering the final composition subject to caking on storage and without destroying its free-flowing characteristics.

The fertilizer compositions of this invention, therefore, contain from about 68 to 98.9% of granular fertilizer, depending upon the amount of micronutrient desired to be incorporated, from about 1 to 20% by weight of the micronutrient, and from about 0.1 to 12% by weight of an aqueous zinc chloride binder solution. It will be understood, of course, that as greater amounts of micronutrients are to be added to the fertilizer, the amount of binder required will also increase, although the ratio of micronutrient to binder will vary between different micronutrient containing compounds.

The aqueous zinc chloride binder solutions of this invention are particularly suitable for binding large amounts of finely divided zinc micronutrient compounds, such as zinc oxide and/or zinc sulfate to various types of granular fertilizers. While both of these compounds have been difficult to combine with fertilizers in the past, it has been found that the binder solutions of this invention permit up to 20% by weight of these compounds to be easily and uniformly combined with the fertilizer granules and also achieve a 90 to 100% retention of the micronutrient compounds on the granule surfaces.

Further, it has been found that the presence of the aqueous zinc chloride binder solution of this invention when used with zinc micronutrient compounds in combination with ammonium fertilizers maintains an acid-base balance in the composition and substantially prevents reaction of the zinc compounds with the fertilizer, thereby preventing the generation and undesirable loss of free ammonia. The zinc content of the zinc chloride binder solution also supplements the zinc micronutrient being distributed throughout the composition, thereby reducing the amount of zinc micronutrient that must be added to the fertilizer.

When zinc oxide is used as the micronutrient, it has been found that about 0.1 to 0.2 part of a 66% aqueous zinc chloride binder solution per part of zinc oxide additive is sufficient to bind the particles of zinc oxide to the fertilizer granules. Thus, for example, about 2 to 4% by weight of the final composition of the zinc chloride binder solution is sufficient to satisfactorily bind an enriched fertilizer composition containing 20% by weight of zinc oxide.

Zinc sulfate, on the other hand, requires the use of approximately 0.35 to 0.60 part of the 66% aqueous zinc chloride binder solution per part of zinc sulfate in the final composition, or about 7 to 12% by weight binder in an enriched, cohesive fertilizer composition containing 20% zinc sulfate.

In a preferred embodiment of this invention, a micronutrient enriched fertilizer composition is provided that comprises a granular fertilizer selected from the group consisting of diammonium phosphate, ammonium nitrate, triple superphosphate, and potassium chloride; from about 1 to 17% zinc sulfate; up to about 3% zinc oxide; and about 0.1 to 12% of a 50 to 60% aqueous zinc chloride solution.

In accordance with this invention, the micronutrient enriched granular fertilizer compositions are prepared by first moistening the fertilizer granules with zinc chloride solution, before adding the micronutrient. This moistening can be accomplished, for example, by spraying an aqueous zinc chloride solution onto tumbling granules of the fertilizer. After the surface of the granules is thoroughly moistened with the binder solution, the finely divided micronutrient is added to the tumbling granules and mixing is continued until the micronutrient has been distributed throughout the mass, and is adhered to the surface of the granules. If excessive moisture in the composition is present following addition of the micronutrient, it can be removed by "dusting" the final product with up to 3% of a finely divided micronutrient, such as zinc oxide or the like.

In a preferred technique, the micronutrient enriched granular fertilizer composition is prepared by initially moistening the fertilizer granules with only a portion of the zinc chloride binder solution and then adding enough micronutrient particles to bring the fertilizer granules to dryness. This process is repeated several times until alternate layers of the micronutrient and binder are achieved on the surface of granules containing the desired amount of micronutrient. Final dusting with zinc oxide or the like can again be used if excessive moisture exists in the final enriched fertilizer composition.

To illustrating the invention more specifically, reference is now made to the following examples. These examples illustrate the preparation of the micronutrient enriched fertilizer compositions of this invention.

The examples are merely illustrative and are not to be understood as limiting the scope and underlying principles of the invention in any way. All percentages referred to herein are by weight based on the total weight of the fertilizer composition, unless otherwise specifically indicated.

EXAMPLE 1

A fertilizer blend, consisting of 50.8 parts of ammonium sulfate and 69.6 parts of triple superphosphate, that has been screened on a 20 mesh screen to remove fine granules is placed in a 2-quart steel mixing-beaker mounted for rotary movement on an inclined axis. The beaker is inclined to avoid segregation of the blend due to variations in size, and the speed of rotation of the beaker is adjusted to produce a gentle tumbling action.

A 66% aqueous solution of zinc chloride is sprayed on the tumbling fertilizer granules with a De Vilbiss atomizer (No. 152) in an amount sufficient to moisten the granules without causing them to stick together. Sufficient powdered zinc sulfate is then added to the tumbling mass to bring the granules to apparent dryness. Alternate application of the binder solution and zinc sulfate is repeated to produce a gradual layering of micronutrient on the surface of the fertilizer granules until about 10 to 15%, based on the weight of the overall composition, of the micronutrient has been added to the tumbling granules. The final enriched fertilizer composition contains 120.4 parts of the fertilizer blend, 21.0 parts of zinc sulfate, and 9.9 parts of zinc chloride.

The composition is then given a final "dusting" in the rotating beaker with 3% of zinc oxide to remove excessive moisture, providing a zinc enriched fertilizer composition containing a total of 8.1% zinc or 6.7% of soluble zinc applied as zinc sulfate and zinc chloride.

The caking tendencies of this fertilizer composition are determined by placing the composition in a 4" x 5½" polyethylene bag. The bas is sealed and the top side punctured with 4 pinholes to permit the escape of trapped air. The contents of the bag are flattened and a 68 lb. weight allowed to rest on top of the bag for 3 days.

At the end of this period, the contents of the bag are examined and classified against a category breakdown of free-flowing, soft-caked (breaks easily between the fingers), or hard-caked. The fertilizer composition of this example is found to be free-flowing.

The degree of adhesion of the micronutrient to the fertilizer granules is then tested by pouring the contents of the fertilizer bag from the caking test through a 30 mesh screen on a Ro-Tap machine for a period of 1 minute. The amount of fines passing through the screen, which are considered to be all micronutrient, are measured to determine the percent of micronutrient permanently adhered to the surface of the ganules. Adhesion of the micronutrient was found to be over 99%.

EXAMPLES 2–8

The procedure of Example 1 is repeated in Examples 2–8 using a variety of fertilizer blends and a 66% zinc

TABLE I

| Example No.: | Enriched fertilizer composition, parts by weight | | Percent of zinc in composition, percent soluble zinc* | Percent adhesion of micronutrient, percent | Comments |
|---|---|---|---|---|---|
| 2 | 63.7 | AN | | | |
|  | 58.0 | TSP | | | |
|  | 20.0 | ZnO | | | |
|  | 2.8 | ZnCl₂ soln. | 11.1 | 98.2 | Free-flowing, low fines, dry. |
| Total | 144.5 | | | | |
| 3 | 48.8 | AN | | | |
|  | 87.0 | DAP | | | |
|  | 27.0 | ZnO | | | |
|  | 5.2 | ZnCl₂ soln. | 13.1 | 98.5 | Do. |
| Total | 168.0 | | | | |
| 4 | 31.9 | AN | | | |
|  | 69.6 | TSP | | | |
|  | 18.0 | ZnO | | | |
|  | 2.8 | ZnCl₂ soln. | 11.9 | 98.6 | Do. |
| Total | 122.3 | | | | |
| 5 | 23.9 | AN | | | |
|  | 69.6 | TSP | | | |
|  | 26.3 | KCl | | | |
|  | 20.0 | ZnO | | | |
|  | 3.4 | ZnCl₂ soln. | 11.3 | 99 | Do. |
| Total | 143.2 | | | | |
| 6 | 76.2 | AS | | | |
|  | 43.5 | TSP | | | |
|  | 20.0 | ZnSO₄ | | | |
|  | 11.3 | ZnCl₂ soln. | | | |
|  | 4.0 | ZnO | 8.6(6.7) | 98.5 | Free-flowing, low fines, dry, ZnO added last. |
| Total | 155.0 | | | | |
| 7 | 51.9 | AS | | | |
|  | 58.0 | DAP | | | |
|  | 21.0 | ZnSO₄ | | | |
|  | 10.6 | ZnCl₂ soln. | | | |
|  | 3.0 | ZnO | 8.3(7.3) | 97.2 | Do. |
| Total | 144.5 | | | | |
| 8 | 38.1 | AS | | | |
|  | 69.6 | TSP | | | |
|  | 26.25 | KCl | | | |
|  | 28.0 | ZnSO₄ | | | |
|  | 9.5 | ZnCl₂ soln. | | | |
|  | 3.0 | ZnO | 8.5(7.1) | 99+ | Do. |
| Total | 174.45 | | | | |

*Soluble zinc applied as ZnSO₄ and ZnCl₂.

NOTE:
AN=ammonium nitrate.
TSP=triple superphosphate.
DAP=diammonium phosphate.
KCl=potassium chloride.
AS=ammonium sulfate.

chloride solution as the binder for the micronutrient. In Examples 2–5, zinc oxide is used as the micronutrient and in Examples 6–8, zinc sulfate is used, along with a minor amount of zinc oxide which is used to finally dry the enriched compositions.

The final compositions of micronutrient enriched fertilizer, including the total concentration of zinc in the compositions are shown below in Table I.

Caking and adhesion tests are run on each composition in accordance with the procedures of Example 1, and the results of these tests are also reported in Table I.

EXAMPLE 9

The procedure of Example 1 is repeated using 5 parts of copper oxide and 5 parts of manganese oxide as the micronutrient in place of the zinc sulfate and zinc oxide micronutrients of Example 1.

The caking and adhesion characteristics of the enriched fertilizer compositions are comparable to those obtained in Example 1.

This invention in its broader aspects is not limited to the specific details shown and described and departures may be made from such details within the reasonable spirit and scope of the accompanying claims without departing from the principles of the invention and without sacrificing its chief advantages.

What is claimed is:

1. A micronutrient enriched fertilizer composition comprising:
   (a) a granular fertilizer;
   (b) up to about 20% by weight of at least one finely divided micronutrient; and
   (c) an aqueous zinc chloride binder solution containing from about 40 to 70% zinc chloride in an amount sufficient to bind the micronutrient to the fertilizer granules.

2. The composition of claim 1, comprising from about 68 to 98.9% by weight of the granular fertilizer, from about 1 to 20% by weight of the micronutrient, and from about 0.1 to 12% by weight of the zinc chloride binder solution.

3. The composition of claim 1, wherein the micronutrient is a zinc containing micronutrient.

4. The composition of claim 3, wherein the zinc containing micronutrient is selected from the group consisting of zinc oxide, zinc sulfate, and mixtures thereof.

5. The composition of claim 1, wherein the granular fertilizer has a mesh size of approximately −5 to +20 and the micronutrient has a mesh size of approximately −100 to −400.

6. The composition of claim 1, wherein the fertilizer is selected from the group consisting of diammonium phosphate, ammonium nitrate, triple superphosphate, potassium chloride, and mixtures thereof.

7. The composition of claim 1, wherein the aqueous zinc chloride binder solution contains from about 50 to 66% zinc chloride.

8. The composition of claim 4, which contains from about 1 to 17% zinc sulfate and up to 3% zinc oxide.

References Cited

UNITED STATES PATENTS

| | | | |
|---|---|---|---|
| 3,186,828 | 6/1965 | Baarson et al. | 71—64 |
| 3,223,518 | 12/1965 | Hansen | 71—64 |
| 3,353,949 | 11/1967 | Nau | 71—64 |
| 3,423,199 | 1/1969 | Philen et al. | 71—59 |

SAMIH N. ZAHARNA, Primary Examiner

C. N. HART, Assistant Examiner

U.S. Cl. X.R.

71—53, 1